US012651987B2

(12) United States Patent (10) Patent No.: US 12,651,987 B2

Kato et al. (45) Date of Patent: Jun. 9, 2026

(54) MOTOR CONTROL DEVICE AND ELECTRIC POWER STEERING DEVICE PROVIDED WITH SAME

(71) Applicant: DENSO CORPORATION, Kariya-city (JP)

(72) Inventors: Takayuki Kato, Kariya-city (JP); Koji Fujimoto, Kariya-city (JP); Atsushi Sato, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 476 days.

(21) Appl. No.: 18/459,182

(22) Filed: Aug. 31, 2023

(65) Prior Publication Data

US 2023/0406404 A1 Dec. 21, 2023

Related U.S. Application Data

(63) Continuation of application No. PCT/JP2022/009082, filed on Mar. 3, 2022.

(30) Foreign Application Priority Data

Mar. 5, 2021 (JP) ................................. 2021-035609

(51) Int. Cl.
| | |
|---|---|
| *H02P 21/00* | (2016.01) |
| *B62D 5/04* | (2006.01) |
| *H02P 21/22* | (2016.01) |

(52) U.S. Cl.
CPC .......... *H02P 21/0085* (2013.01); *B62D 5/046* (2013.01); *H02P 21/22* (2016.02)

(58) Field of Classification Search
CPC ...... H02P 21/0085; H02P 21/22; B62D 5/046
See application file for complete search history.

(56) References Cited

U.S. PATENT DOCUMENTS

| | | | |
|---|---|---|---|
| 2006/0125439 A1* | 6/2006 | Ajima ...................... | B60K 6/48 |
| | | | 318/716 |
| 2007/0107973 A1 | 5/2007 | Jiang et al. | |
| 2015/0222215 A1* | 8/2015 | Ishida ................... | H02P 21/141 |
| | | | 318/400.02 |
| 2023/0412100 A1* | 12/2023 | Kitagawa ................. | B62D 5/04 |

FOREIGN PATENT DOCUMENTS

| | | |
|---|---|---|
| JP | 2006-141095 A | 6/2006 |

* cited by examiner

*Primary Examiner* — Zoheb S Imtiaz

(74) *Attorney, Agent, or Firm* — Precision Patents, P.C.

(57) ABSTRACT

A field-weakening controller determines a d-axis current command correction value in field-weakening control according to a modulation factor that correlates with the ratio of the voltage amplitude applied to the inverter to the power supply voltage. A d-axis current final value calculator outputs a d-axis current command final value calculated using a d-axis current command value and a d-axis current command correction value. A Current controller performs feedback control of the d-axis current command final value and the q-axis current command value. A d-axis current adjuster adjusts the d-axis current command final value based on the q-axis current command value so as to suppress an influence of the frequency component of the q-axis current command value in a specific frequency band for which at least a lower limit frequency is determined.

9 Claims, 10 Drawing Sheets

LIMIT LINE $$Id^{**}=f(Iq^*)$$

LIMIT LINE

MOTOR CONTROL DEVICE AND ELECTRIC POWER STEERING DEVICE PROVIDED WITH SAME

CROSS REFERENCE TO RELATED APPLICATIONS

This application is a continuation application of International Patent Application No. PCT/JP2022/009082 filed on Mar. 3, 2022, which designated the U.S. and based on and claims the benefits of priority of Japanese Patent Application No. 2021-035609 filed on Mar. 5, 2021. The entire disclosure of all of the above applications is incorporated herein by reference.

TECHNICAL FIELD

The present disclosure relates to a motor control device and an electric power steering device including the same.

BACKGROUND

Conventionally, a motor control device performs vector control of a three-phase brushless motor.

SUMMARY

An object of the present disclosure is to provide a motor control device that suppresses a generation of noise and vibration.

A motor control device of the present disclosure is applied to a motor drive system in which power from a DC power supply is converted into three-phase AC power by an inverter and supplied to a brushless motor for calculating a voltage command output to the inverter by vector control.

This motor control device includes a torque command/current command converter, a field-weakening controller, a d-axis current final value calculator, a current controller, and a d-axis current adjuster.

The torque command/current command converter converts an input torque command into a d-axis current command value and a q-axis current command value. The field-weakening controller determines a d-axis current command correction value in a field-weakening control according to a modulation factor that correlates with a ratio of a voltage amplitude applied to an inverter to a voltage of a DC power supply. The d-axis current final value calculator outputs a d-axis current command final value calculated using the d-axis current command value and the d-axis current command correction value. The current controller performs a feedback control of the d-axis current command final value and the q-axis current command value.

The d-axis current adjuster adjusts the d-axis current command final value based on the q-axis current command value so as to suppress the influence of a frequency component of the q-axis current command value in a specific frequency band for which at least a lower limit frequency is determined.

BRIEF DESCRIPTION OF THE DRAWINGS

The above and other objects, features and advantages of the present disclosure will become more apparent from the following detailed description made with reference to the accompanying drawings.

In the drawings:

Figure 3:
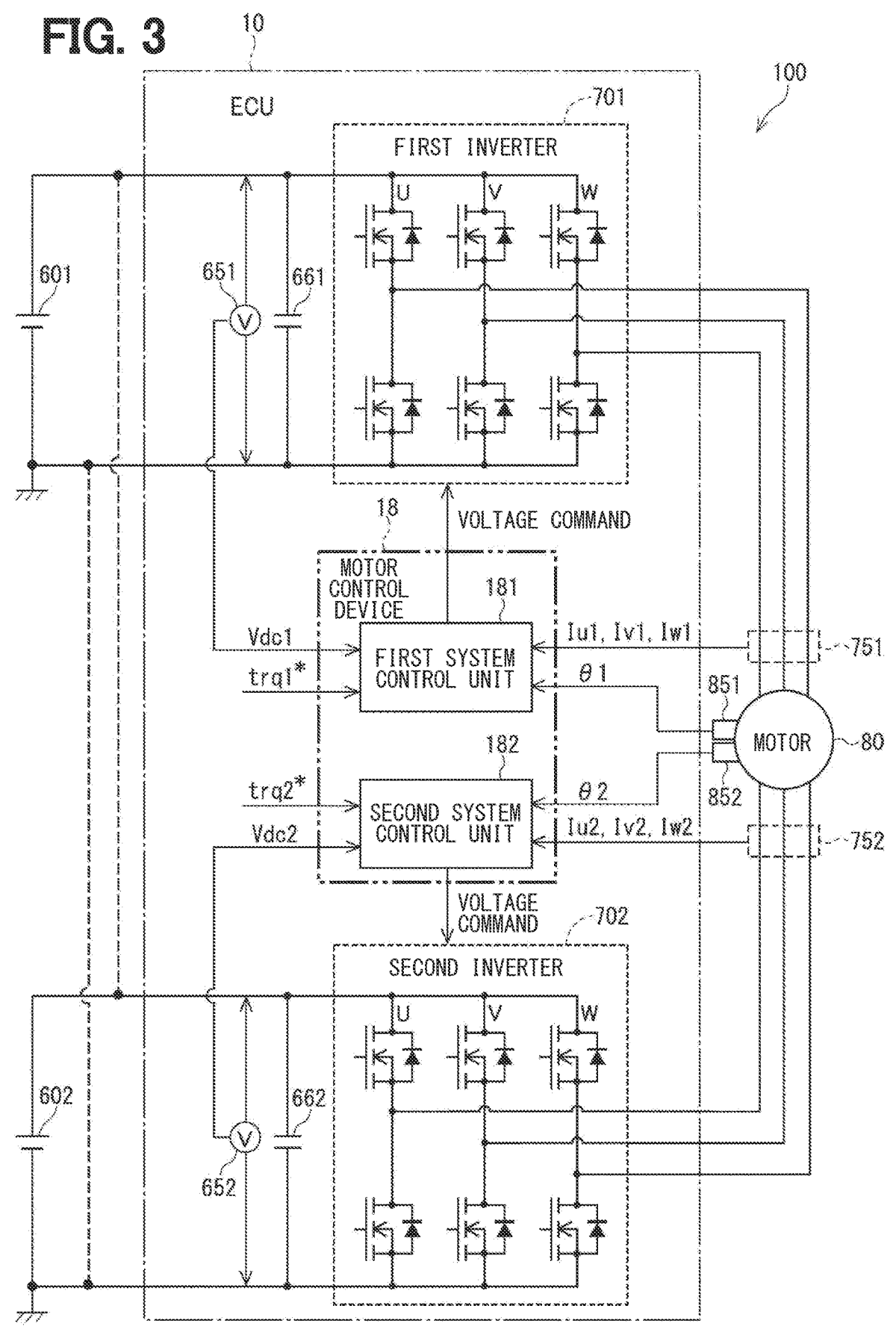

FIG. 3 is a configuration diagram of a dual motor drive system;

DETAILED DESCRIPTION

Figure 1:
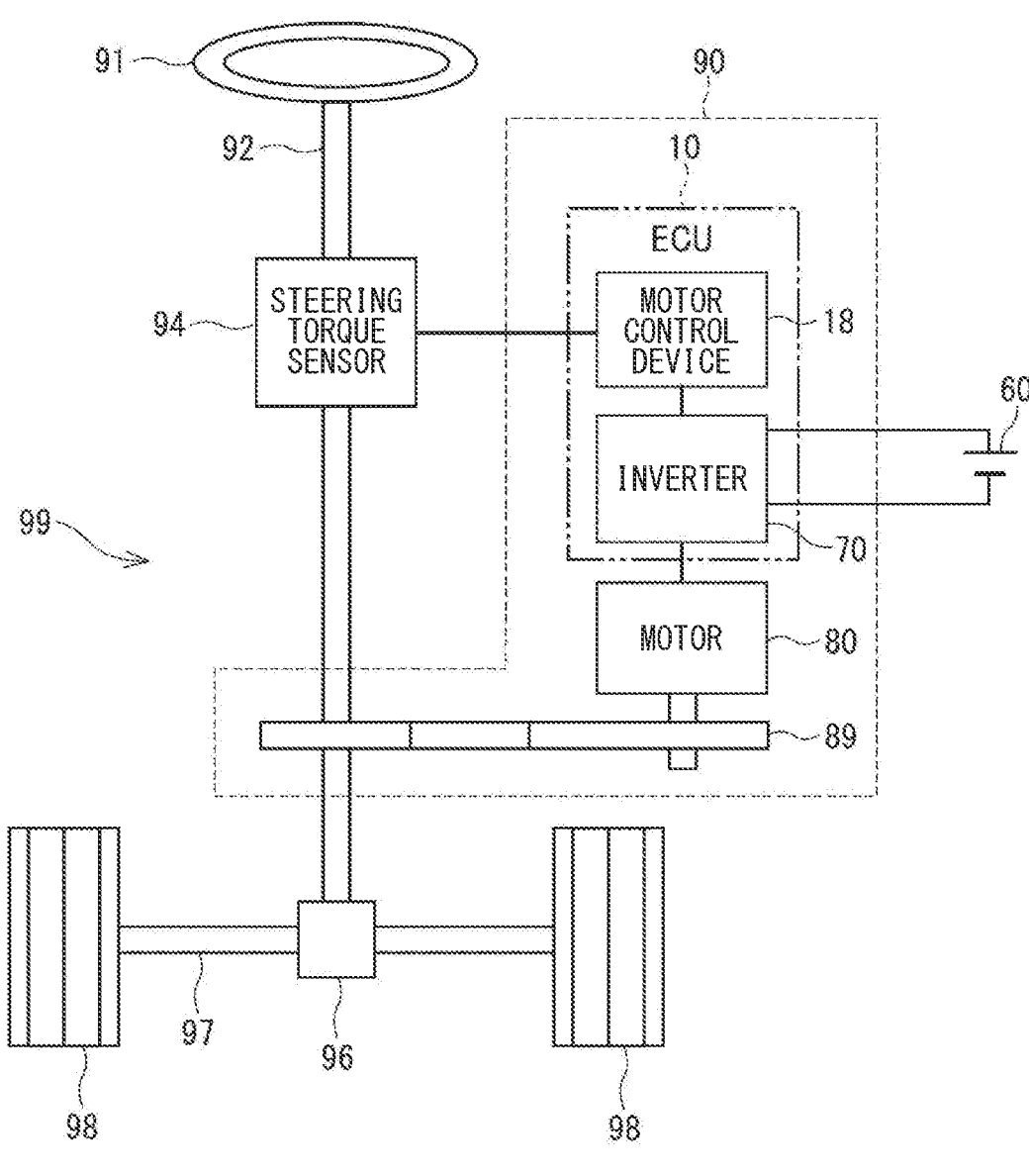
FIG. 1 is a configuration diagram of an electric power steering device to which a motor control device of each embodiment is applied.

In a motor control device of an assumable example that performs vector control of a three-phase brushless motor, in order to prevent the current from becoming difficult to flow in the motor windings due to a counter electromotive force generated at high speed, a technique of performing field-weakening control by passing a negative d-axis current is known. In a control device that controls the drive of a steering assist motor in an electric power steering system, when the d-axis current of field-weakening control flows steeply in order to increase the rotation speed of the motor in response to sudden steering wheel operation, an electric resonance phenomenon of the motor is induced and pulsation occurs in the dq-axis current. As a result, an output torque of the motor vibrates, and noise and vibration that the driver feels uncomfortable may occur. For example, the example discloses a motor drive control device that suppresses the generation of noise and vibration by limiting the change rate of the d-axis current command value during field-weakening control.

The technique of the example focuses only on a change rate of a d-axis current command value, but does not pay attention to the effects on sound and vibration caused by changes in the q-axis current command value that occur with reverse input to the motor. Therefore, countermeasures against noise and vibration due to the influence of changes in the q-axis current command value during field-weakening control are insufficient.

An object of the present disclosure is to provide a motor control device that suppresses a generation of noise and vibration due to an influence of changes in the q-axis current command value in the motor control device that performs field-weakening control by vector control of a three-phase brushless motor.

A motor control device of the present disclosure is applied to a motor drive system in which power from a DC power supply is converted into three-phase AC power by an inverter and supplied to a brushless motor for calculating a voltage command output to the inverter by vector control.

This motor control device includes a torque command/ current command converter, a field-weakening controller, a d-axis current final value calculator, a current controller, and a d-axis current adjuster.

The torque command/current command converter converts an input torque command into a d-axis current command value and a q-axis current command value. The field-weakening controller determines a d-axis current command correction value in a field-weakening control according to a modulation factor that correlates with a ratio of a voltage amplitude applied to an inverter to a voltage of a DC power supply. The d-axis current final value calculator outputs a d-axis current command final value calculated using the d-axis current command value and the d-axis current command correction value. The current controller performs a feedback control of the d-axis current command final value and the q-axis current command value.

The d-axis current adjuster adjusts the d-axis current command final value based on the q-axis current command value so as to suppress the influence of a frequency component of the q-axis current command value in a specific frequency band for which at least a lower limit frequency is determined.

Accordingly, in the present disclosure, in a motor control device that performs field-weakening control by vector control of a three-phase brushless motor, it is possible to appropriately suppress the generation of noise and vibration due to the influence of changes in the q-axis current command value.

A motor control device according to an embodiment of the present disclosure will be described with reference to the drawings. The motor control device of the present embodiment is applied to a motor drive system that drives a steering assist motor in an electric power steering device for a vehicle. In this motor drive system, power from a DC power supply is converted into three-phase AC power by an inverter and supplied to a brushless motor. The motor control device calculates a voltage command to be output to the inverter by vector control.

[Electric Power Steering Device]

FIG. 1 shows an overall configuration of a steering system 99 including an electric power steering device 90. Although the electric power steering device 90 shown in FIG. 1 is column assist type, a motor control device 18 may be applied to an electric power steering device of rack assist type. The ECU 10 includes a motor control device 18 and an inverter 70. For example, the ECU 10 is configured integrally with a motor 80.

The steering system 99 includes a steering wheel 91, a steering shaft 92, a pinion gear 96, a rack shaft 97, road wheels 98, an electric power steering device 90 and the like. The pinion gear 96 provided at an axil end of the steering shaft 92 engages with the rack shaft 97. A pair of wheels 98 are provided at both ends of the rack shaft 97. When a driver rotates the steering wheel 91, the steering shaft 92 coupled to the steering wheel 91 rotates. A rotational motion of the steering shaft 92 is converted into a linear motion of the rack shaft 97 by the pinion gear 96, and the pair of wheels 98 are steered at an angle corresponding to a displacement amount of the rack shaft 97.

The electric power steering device 90 includes a steering torque sensor 94, a motor control device 18, the inverter 70, the motor 80, a reduction gear 89, and the like. The steering torque sensor 94 detects the steering torque of the driver. The motor control device 18 calculates a voltage command according to the required torque calculated from information such as the steering torque, and outputs the voltage command to the inverter 70. The inverter 70 converts the power of DC power supply 60 into three-phase AC power based on the voltage command and supplies the three-phase AC power to motor 80. The steering assist torque generated by the motor 80 is transmitted to the steering shaft 92 via the reduction gear 89.

The motor 80 is a three-phase brushless motor. The present embodiment is applicable to both SPM motors and IPMs. However, due to the characteristic that the d-axis current command value is adjusted according to the q-axis current command value as described later, it is more effective in IPM motors that generate reluctance torque that depends on the d-axis current and the q-axis current.

[Dual Motor Drive System]

Next, with reference to FIGS. 2 and 3, a configuration example of the dual motor drive system will be described. The motor 80 in this motor drive system is a double winding motor having two sets of three phase windings 801 and 802, as shown in FIG. 3. The three phase windings 801 and 802 have the same electrical characteristics and are wound on a common stator while being shifted from each other, for example, by an electrical angle of 30 degrees. According to this configuration, phase currents having the same amplitude and a phase difference of 30 [deg] are supplied to the windings 801 and 802.

Two inverters 701 and 702 provided corresponding to the two sets of windings 801 and 802 supply three-phase AC power to each of the windings 801 and 802. The first inverter 701 is connected to the U1, V1, W1 terminals of the first winding 801. The second inverter 702 is connected to the U2, V2, W2 terminals of the second winding 802.

FIG. 3 shows the configuration of the dual motor drive system 100. A group of components corresponding to the first inverter 701 is referred to as a first system, and a group of components corresponding to the second inverter 702 is referred to as a second system. "1" is added to the end of the code or signal of the components of the first system, and "2" is added to the end of the code or signal of the components of the second system. The two systems are redundantly provided, and if one system fails, the other normal system can continue to drive the motor 80.

The inverters 701 and 702 of each system may be individually connected to two DC power supplies 601 and 602 as indicated by solid lines, or connected in parallel to one DC power supply (for example, 601) as indicated by broken lines. A system configuration in which two systems of inverters 701 and 702 are connected to separate DC power supplies 601 and 602 is called "complete two system". A system configuration in which two systems of inverters 701 and 702 are connected in parallel to a common DC power supply is called a "drive two system". The complete two system can continue to drive the motor even if one DC power supply fails. Hereinafter, FIG. 3 will be described on the assumption that the system configuration is the complete two system.

Since each system has the same configuration, the configuration of the first system will be described as a representative. Regarding the configuration of the second system, the suffix "1" in the description of the configuration of the first system is replaced with "2" and interpreted in the same way. On an input side of inverter 701, a voltage detector 651 for detecting a voltage Vdc1 of DC power supply 601 and a smoothing capacitor 661 for smoothing an input voltage are provided. Hereinafter, the voltage of the DC power supply is referred to as "power supply voltage".

A three-phase current path from the inverter 701 to the motor 80 is provided with a current detector 751 that detects phase currents Iu1, Iv1, and Iw1. Further, in the example of FIG. 3, rotation angle detectors 851 and 852 for detecting the electrical angle of the motor 80 are provided for each system, and detect electrical angles θ1 and θ2, respectively. In a configuration used by one rotation angle detector, for example, the electrical angle θ2 may be calculated as "θ2=θ1+30 [deg]" based on the electrical angle θ1.

The motor control device 18 is composed of a microcomputer, a pre-driver, etc., and has a CPU, a ROM, an I/O (not shown), a bus line connecting these components, and the like. The motor control device 18 executes software processing by executing a program stored in advance by the CPU, and control by hardware processing by a dedicated electronic circuit.

The motor control device 18 includes a first system control unit 181 and a second system control unit 182. The configuration of the control units 181 and 182 of each system corresponds to the configuration of the motor control device 18 of one system shown in FIG. 4. The first system control unit 181 acquires a torque command trq1* shared by the first system out of the required torque. Also, the first system control unit 181 acquires the power supply voltage Vdc1, the phase currents Iu1, Iv1, Iw1, and the rotation angle θ1 from the voltage detector 651, the current detector 751, and the rotation angle detector 851.

Based on these information, first system control unit 181 calculates a voltage command to be output to the inverter 701 by vector control. The inverter 701 is configured by bridge-connecting switching elements of upper and lower arms of each phase of U-phase, V-phase, and W-phase. The inverter 701 converts the power of DC power supply 601 into three-phase AC power by operating each switching element based on the voltage command, and supplies it to the first winding 801 of the motor 80.

Figure 4:
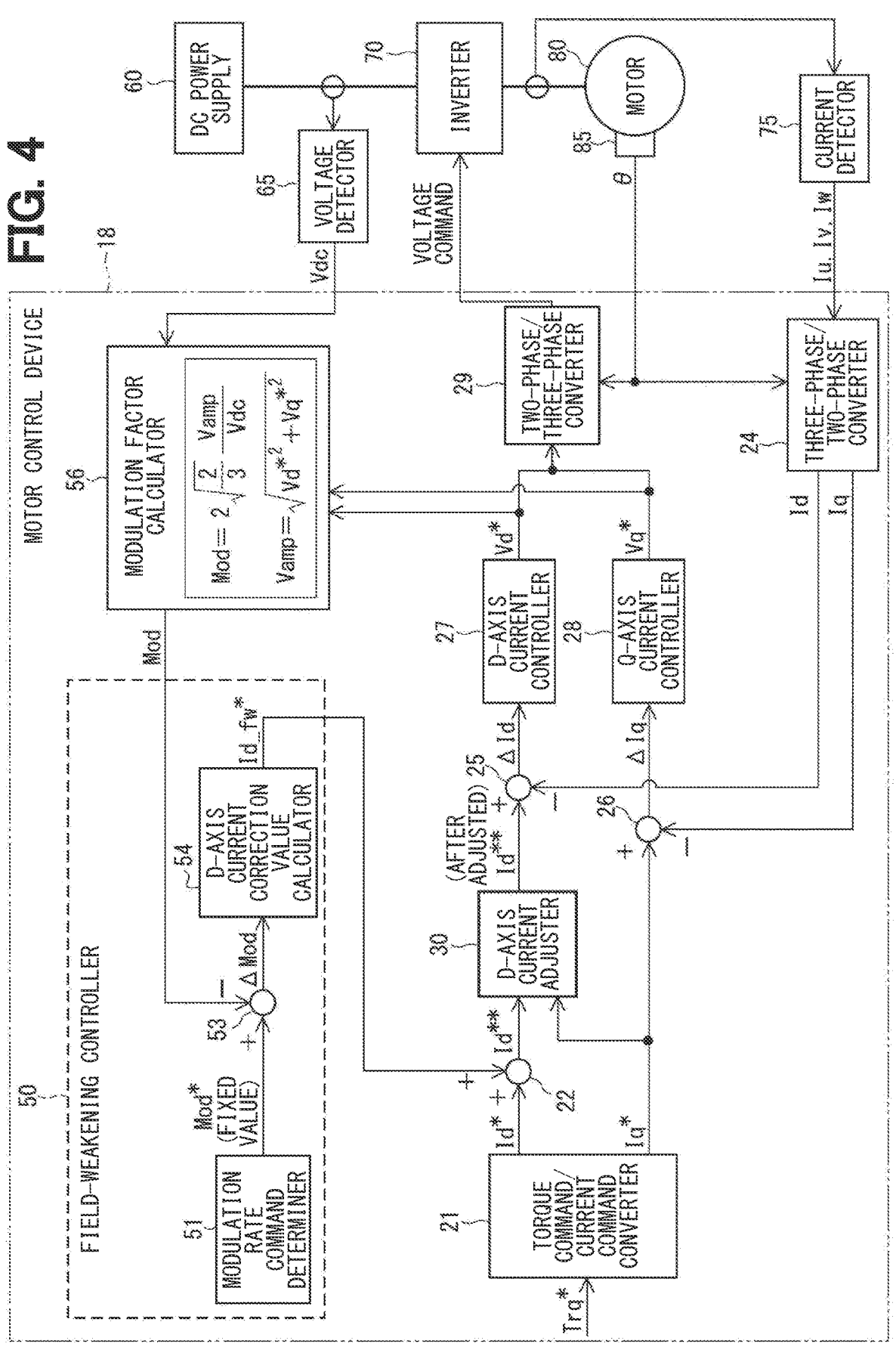
FIG. 4 is a control block diagram of the motor control device of one embodiment.

Regarding the components described later with reference to FIG. 4, in two systems of the motor drive system, the motor control device 18 includes two sets of current controllers and two field-weakening controllers corresponding to the two inverters 701 and 702. The motor control device 18 outputs a voltage command to each of the inverters 701 and 702. The first system control unit 181 and the second system control unit 182 basically calculate voltage commands independently based on information for each system. However, if necessary, cooperative control may be performed by communicating information between systems.

[Motor Control Device]

A detailed configuration of the motor control device according to each embodiment that performs field-weakening control by vector control of a three-phase brushless motor will be described in order. First, the technical significance of field-weakening control will be described. When the motor speed is high, the counter electromotive force generated in proportion to the rotor magnet flux and rotation speed becomes larger than the inverter output power. It becomes difficult to generate current in the motor windings. As a countermeasure against this phenomenon, by generating a negative d-axis current so as to weaken the magnet flux, it becomes possible to generate a current even under high rotation conditions.

By the way, when the d-axis current in the field-weakening control flows steeply, an electrical resonance phenomenon is induced in the motor 80, and the dq-axis current pulsates. Therefore, the output torque of the motor 80 oscillates. In the electric power steering device 90, this oscillation may cause noise and vibration that the driver feels uncomfortable.

The conventional technology limits the rate of change of the d-axis current command value, but does not pay attention to the effects on sound and vibration caused by changes in the q-axis current command value caused by reverse input to the motor. Therefore, in the motor control device of the present embodiment, it is intended to suppress the generation of noise and vibration due to the influence of the change in the q-axis current command value in the field-weakening control.

One Embodiment

The configuration of the motor control device 18 of one embodiment will be described with reference to FIGS. 4 and 5. For the sake of simplicity, the configuration applied to a single motor drive system is illustrated. The reference numerals of the DC power supply, voltage detector, inverter, current detector, and rotation angle detector of the motor drive system are denoted as 60, 65, 70, 75, 85 by deleting the "1" and "2" at the end of the reference numerals in FIG. 3. The same applies to symbols for the torque command trq*, the power supply voltage Vdc, the three-phase currents Iu, Iv, Iw, and the electrical angle θ. When applied to a two-system motor drive system, it can be interpreted as providing two sets of one-system configurations.

The motor control device 18 has configurations for vector control, current feedback control and field-weakening control. First, as a well-known configuration, the motor control device 18 includes a torque command/current command converter 21, a d-axis current final value calculator 22, a three-phase/two-phase converter 24, a d-axis current deviation calculator 25, a q-axis current deviation calculator 26, a d-axis current controller 27, a q-axis current controller 28 and a two-phase/three-phase converter 29.

The torque command/current command converter 21 converts the torque command trq* input from the host control circuit into a d-axis current command value Id* and a q-axis current command value Iq*. The symbol '/' means that the input before the '/' is converted to the output after the '/'. The same applies to the three-phase/two-phase converter 24 and the two-phase/three-phase converter 29.

The d-axis current final value calculator 22 outputs a d-axis current command final value Id** calculated using the d-axis current command value Id* and a d-axis current command correction value Id_fw* calculated by a d-axis current correction value calculator 54 of a field-weakening controller 50. In the configuration example shown in FIG. 4, the d-axis current final value calculator 22 adds the d-axis current command value Id* and the axis current command correction value Id_fw*.

The three-phase/two-phase converter 24 converts the 3-phase currents Iu, Iv, and Iw obtained from the current detector 75 into dq-axis currents Id and Iq using the electrical angle θ. The d-axis current deviation calculator 25 calculates a deviation ΔId between the d-axis current command final value Id and the fed-back d-axis current Id. As the d-axis current command final value Id, a value adjusted by the d-axis current adjuster 30, which will be described later, is input. The q-axis current deviation calculator 26 calculates a deviation ΔIq between the q-axis current command value Iq* and the fed-back q-axis current Iq.

The current controllers 27 and 28 perform feedback control of the d-axis current command final value Id** and the q-axis current command value Iq*. Specifically, the d-axis current controller 27 calculates the d-axis voltage command value Vd* by PI calculation or the like so that the d-axis current deviation ΔId approaches zero. The q-axis current controller 28 calculates the q-axis voltage command value Vq* by PI calculation or the like so that the q-axis current deviation ΔIq approaches zero.

The two-phase/three-phase converter 29 converts the dq-axis voltage command values Vd* and Vq* into three-phase voltage commands using the electrical angle θ, and outputs the three-phase voltage commands to the inverter 70. A three-phase voltage command for the fixed coordinate system is a sine wave voltage. The calculation of the duty ratio based on the voltage command and generation of the pulse signal by PWM are included in the inverter 70, and detailed description thereof will be omitted.

Further, the motor control device 18 includes a field-weakening controller 50 and a modulation factor calculator 56 as a configuration for the field-weakening control. The field-weakening controller 50 determines the d-axis current command correction value Id_fw* in the field-weakening control according to a modulation factor Mod calculated by the modulation factor calculator 56. The modulation factor Mod correlates with "the ratio of the voltage amplitude Vamp applied to the inverter 70 to the power supply voltage Vdc".

The modulation factor calculator 56 calculates the modulation factor Mod using equations (1) and (2) based on the power supply voltage Vdc, the d-axis voltage command value Vd*, and the q-axis voltage command value Vq*. A proportional coefficient $2\sqrt{(2/3)}$ in Equation (1) is an example value employed in the present embodiment. The modulation factor Mod may be defined using a proportionality coefficient other than that.

$$Mod=2\sqrt{(2/3)}\times Vamp/Vdc \qquad (1)$$

$$Vamp=\sqrt{(Vd^{*2}+Vq^{*2})} \qquad (2)$$

The field-weakening controller 50 includes a modulation rate command determiner 51, a modulation rate deviation calculator 53 and a d-axis current correction value calculator 54. The modulation rate command determiner 51 outputs a fixed value modulation rate command Mod*. The modulation factor deviation calculator 53 calculates a deviation Δ Mod between a modulation factor command Mod* and a modulation factor Mod calculated by the modulation factor calculator 56. The d-axis current correction value calculator 54 calculates a d-axis current command correction value Id_fw* by PI calculation or the like so that the modulation factor deviation Δ Mod approaches zero.

Furthermore, the motor control device 18 includes a d-axis current adjuster 30 between the d-axis current final value calculator 22 and the d-axis current deviation calculator 25 as a configuration specific to the present embodiment. The d-axis current adjuster 30 adjusts the d-axis current command final value Id** based on the q-axis current command value Iq* so as to suppress the influence of the frequency component of the q-axis current command value Iq* in a specific frequency band.

At least a lower limit frequency is determined for the specific frequency band to be suppressed, and frequency components on the lower frequency side than the lower limit frequency are not to be suppressed. An upper frequency limit may or may not be determined. The variations will be described later with reference to FIGS. 8 to 10.

Figure 5:
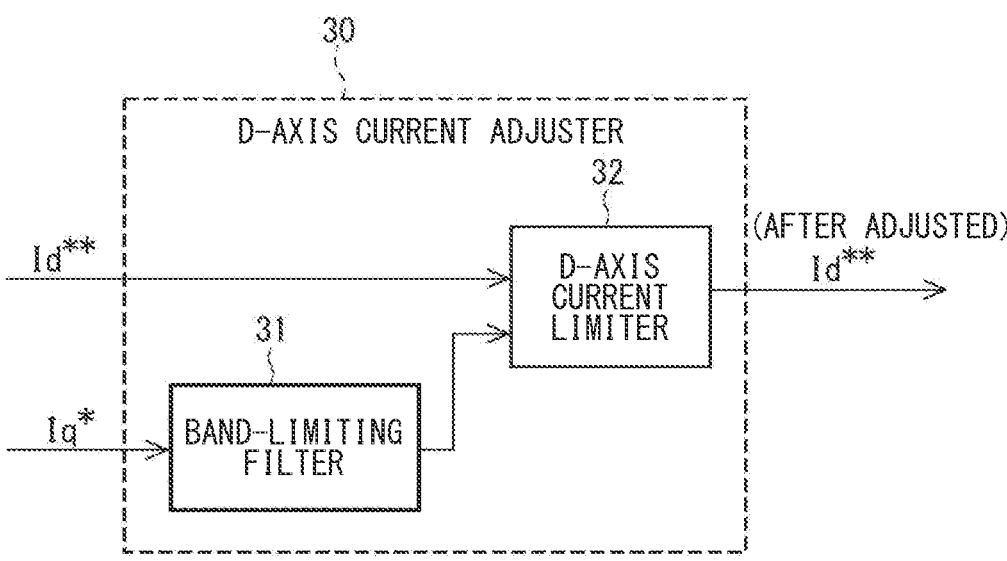
FIG. 5 is a block diagram of a d-axis current adjuster.

As shown in FIG. 5, the d-axis current adjuster 30 includes a band-limiting filter 31 and a d-axis current limiter 32. The band-limiting filter 31 cuts an input of a frequency component of the q-axis current command value Iq* in a specific frequency band. Therefore, a temporal change in the q-axis current command value Iq* in the specific frequency band is suppressed. The d-axis current limiter 32 adjusts the d-axis current command final value Id** based on the q-axis current command value Iq* that has passed through the band-limiting filter 31.

Here, "adjustment" means limiting the absolute value of the d-axis current command final value Id**, which is a negative value, to a limit value or less corresponding to the q-axis current command value Iq*. When the absolute value of the input d-axis current command final value Id is less than the limit value, the input value is output as is. When the absolute value of the input d-axis current command final value Id is greater than or equal to the limit value, the limit value is output regardless of the input value. As a result, power consumption and heat generation of the inverter 70 are suppressed.

For example, the d-axis current limiter 32 uses a limit map to limit the absolute value of the d-axis current command final value Id** to a limit value corresponding to the q-axis current command value Iq* or less. FIGS. 6A, 6B, 7A, and 7B show examples of limit maps of the d-axis current limiter 32. The limit map is defined in the range of "Iq*≥0, Id**≤0" of the dq-axis coordinates.

The d-axis current limiter 32 defines a relationship between the q-axis current command value Iq* and the d-axis current command final value Id** in consideration of a balance between the required output and the loss within the range of a limit line at the rated current. The rated current is defined as Ir, the limit line is expressed by Equation (3). In the dq-axis coordinates, the limit line is illustrated by an arc of radius Ir centered at an origin.

$$Ir=\sqrt{(Iq^{*2}+Id^{**2})} \qquad (3)$$

The shape of the map can be set arbitrarily within the limits of the rated current. In the description of this part, description of the names of "q-axis current command value" and "d-axis current command final value" is omitted, and only symbols Iq* and Id** are described.

Figure 6A:
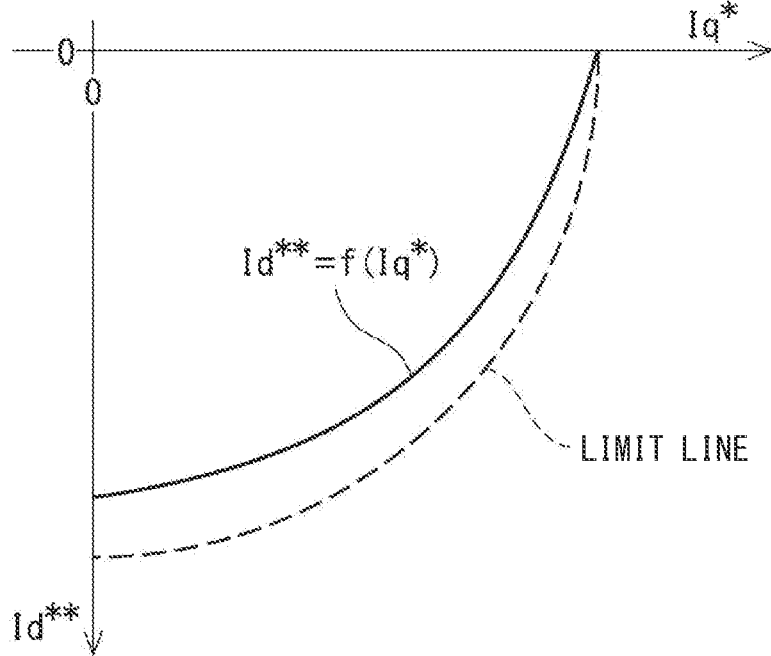
FIG. 6A is an example of a limit map for a d-axis current limiter.

In the map shown in FIG. 6A, Id** varies curvilinearly along the limit line.

Figure 6B:
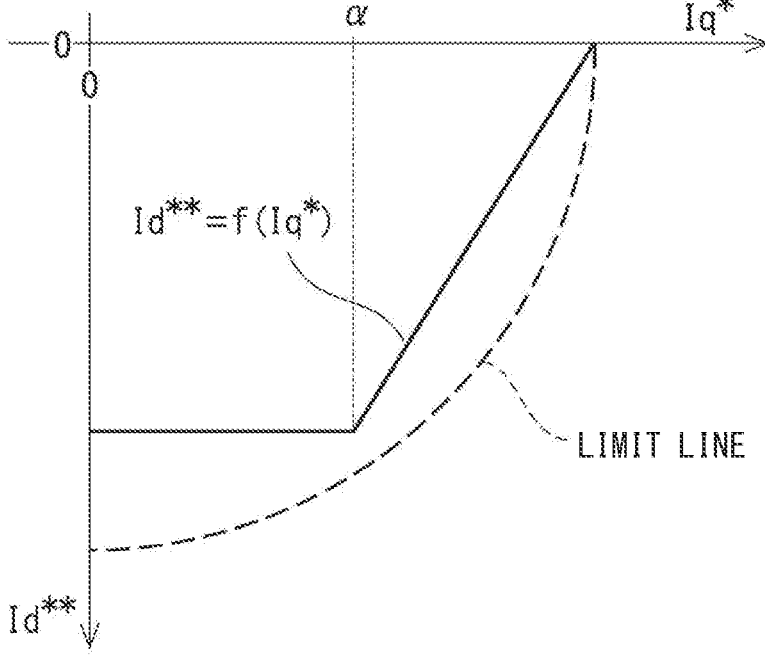
FIG. 6B is an example of a limit map for a d-axis current limiter.

In the map shown in FIG. 6B, Id** is constant in the range of 0≤Iq*≤α, and Id** increases linearly as Iq* increases in the range of α<Iq*.

Figure 7A:
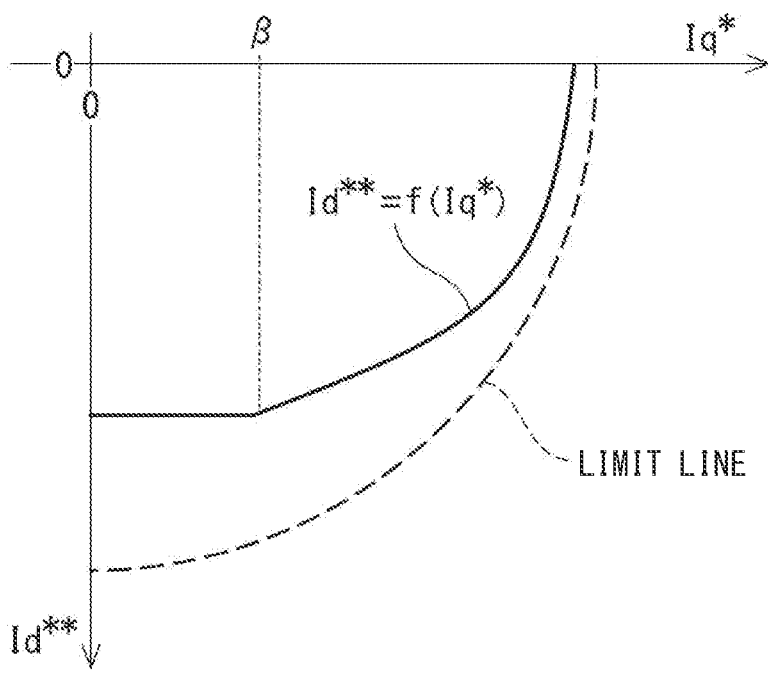
FIG. 7A is an example of a limit map for a d-axis current limiter.

In the map shown in FIG. 7A, Id** is constant in the range of 0≤Iq*≤β, and Id** increases outward in a curve as Iq* increases in the range of β<Iq*.

Figure 7B:
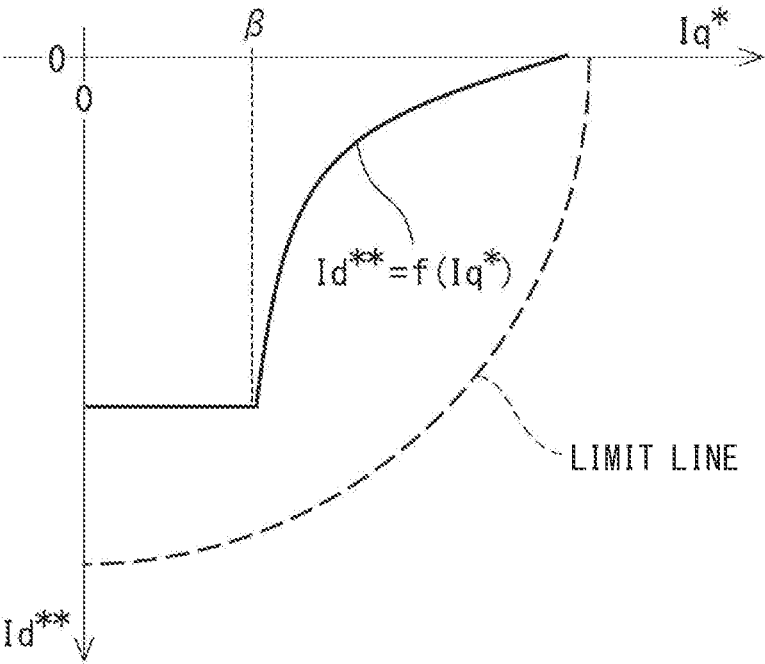
FIG. 7B is an example of a limit map for a d-axis current limiter.

In the map shown in FIG. 7B, Id** is constant in the range of 0≤Iq*≤β, and Id** increases in a curve concave inward as Iq* increases in the range of β<Iq*.

Besides the map, the d-axis current limiter 32 may use the function f(Iq*) of the q-axis current command value Iq* to calculate the limit value of the d-axis current command final value Id**. For example, the function f(Iq*) is represented by a polynomial like Equation (4). a, b, and c in formula (4) are constants.

$$f(Iq^{*})=a^{*}Iq^{*2}+b^{*}Iq^{*}+c \qquad (4)$$

The band-limiting filter 31 preferably consists of a plurality of primary filters. By combining a plurality of primary filters, the band-limiting filters with different effects can be easily designed according to the purpose. A configuration example of the band-limiting filter 31 composed of a plurality of primary filters will be described with reference to FIGS. 8 to 10. The codes of the band-limiting filters in each of the configuration examples 1, 2, and 3 are represented by 311, 312, and 313, respectively. In the frequency characteristic diagrams of FIGS. 8 to 10, f on the horizontal axis represents frequency, and G on the vertical axis represents gain.

Figure 8:
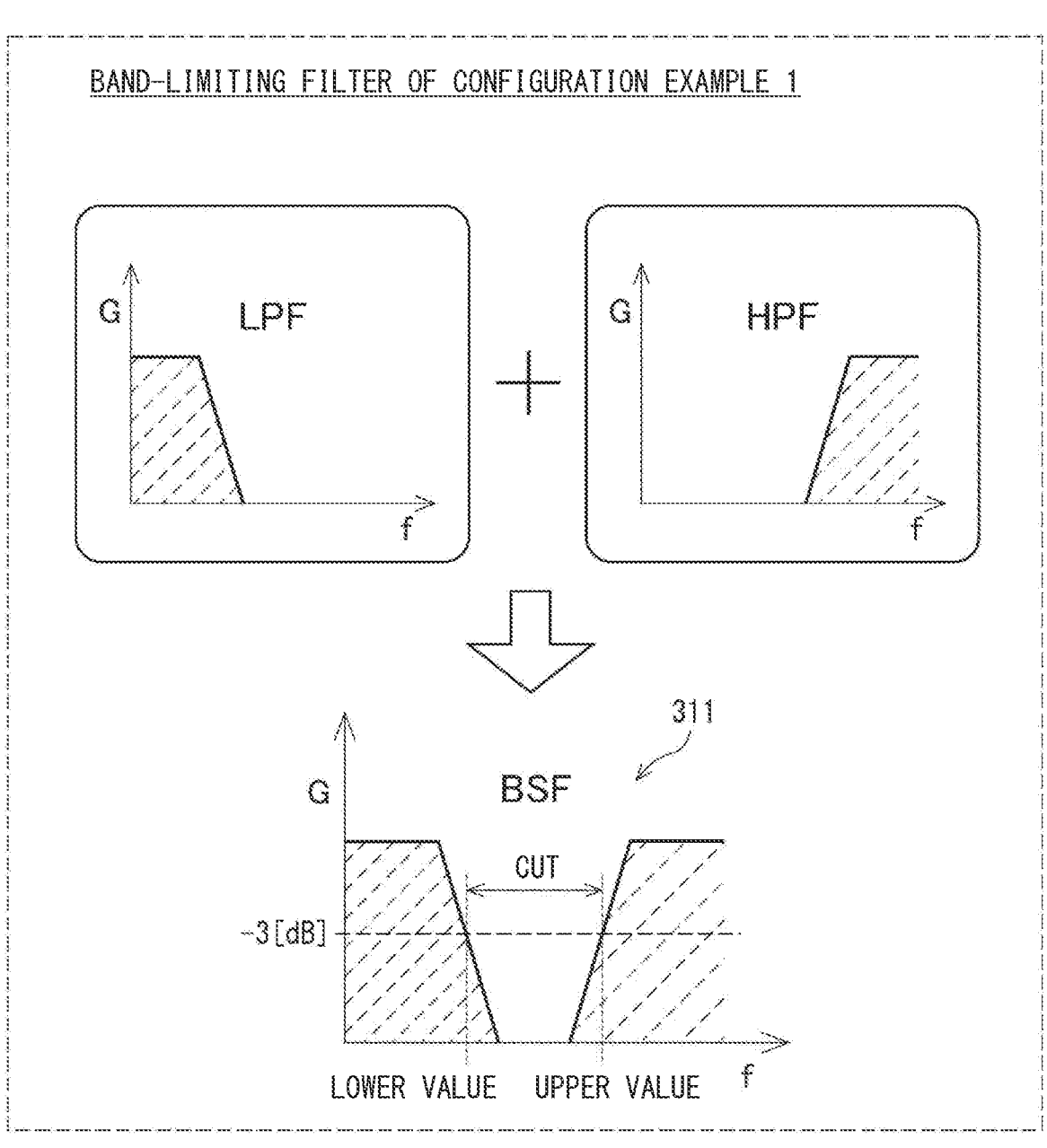
FIG. 8 is a diagram of configuration example 1 of a band-limiting filter.

The band-limiting filter 311 of configuration example 1 is a band-stop filter configured from one or more low-pass filters and one or more high-pass filters. FIG. 8 shows a band-stop filter composed of one low-pass filter LPF and one high-pass filter HPF as the band-limiting filter 311. The low-pass filter may be composed of a plurality of low-pass filters, and the high-pass filter may be composed of a plurality of high-pass filters, without being limited to the example of FIG. 8.

The band-limiting filter 311 has an upper limit frequency in addition to a lower limit frequency of a specific frequency band, and cuts frequency components between the lower limit frequency and the upper limit frequency of the specific frequency band in the q-axis current command value Iq*. In other words, the band-limiting filter 311 passes frequency components lower than the lower limit frequency and frequency components higher than the upper limit frequency. The terms of lower limit frequency and upper limit frequency mean cutoff frequencies when the gain G is −3 [dB], for example.

For example, in the electric power steering device 90, when the motor 80 is regeneratively driven by road noise or the like input from the road surface, a q-axis current in a certain frequency band is generated. By cutting the frequency component of the q-axis current using the band-limiting filter 311 having the frequency band as a specific frequency band, the influence of the reverse input on the d-axis current command value can be eliminated.

Figure 9:
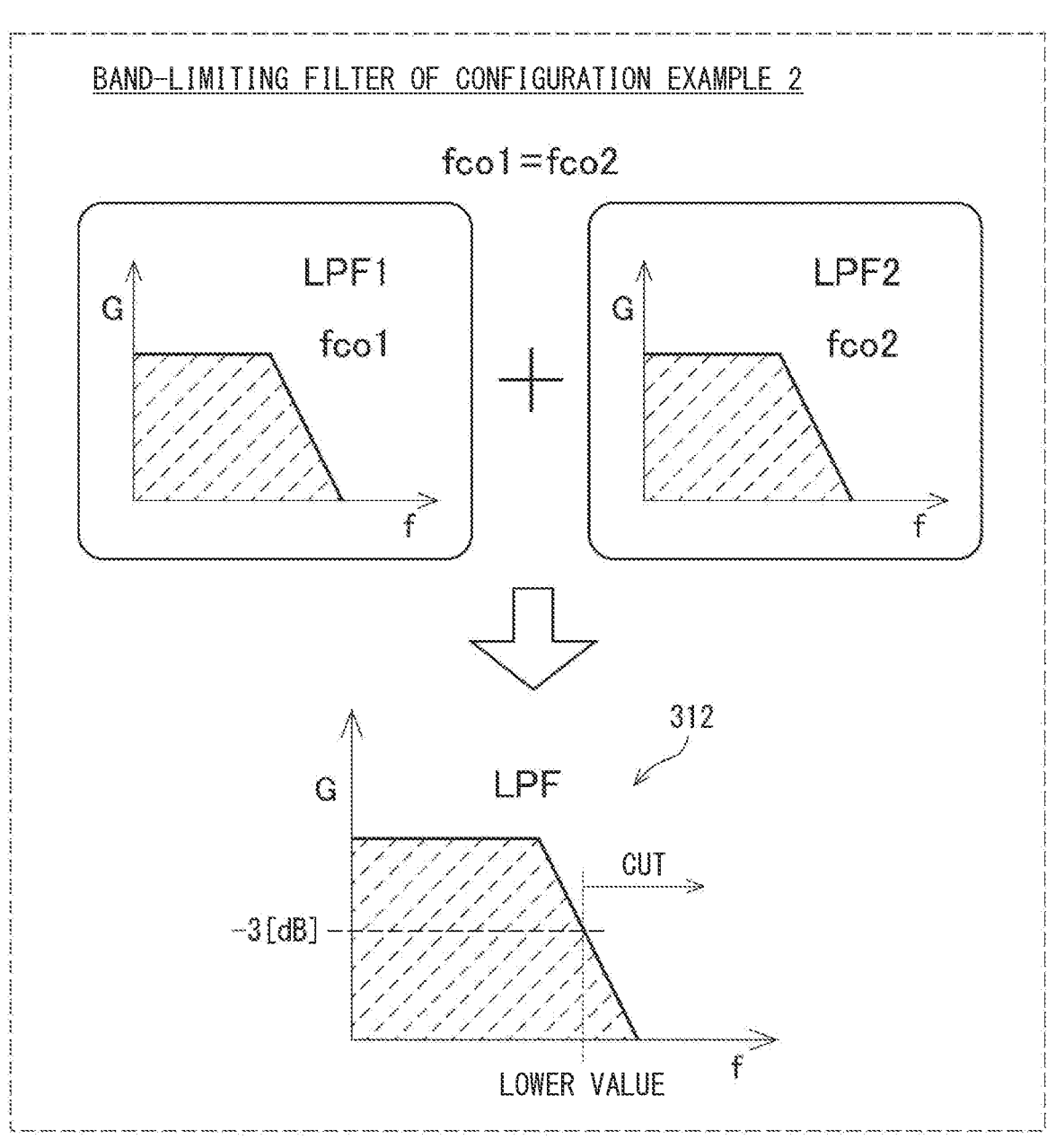
FIG. 9 is a diagram of configuration example 2 of a band-limiting filter.

The band-limiting filter 312 of a configuration example 2 is composed of a plurality of low-pass filters having the same cutoff frequency. FIG. 9 shows a band-limiting filter 312 composed of two low-pass filters LPF1 and LPF2. The cutoff frequency fco1 of the low-pass filter LPF1 and the cutoff frequency fco2 of the low-pass filter LPF2 are the same. "same" is interpreted to include a variation range that is commonly regarded as identical in the technical field of filters.

In the configuration example 2, noise superimposed on the q-axis current and current fluctuations can be sharply cut. Therefore, noise in the d-axis current due to fluctuations in the q-axis current and the influence of current fluctuations can be cut.

Figure 10:
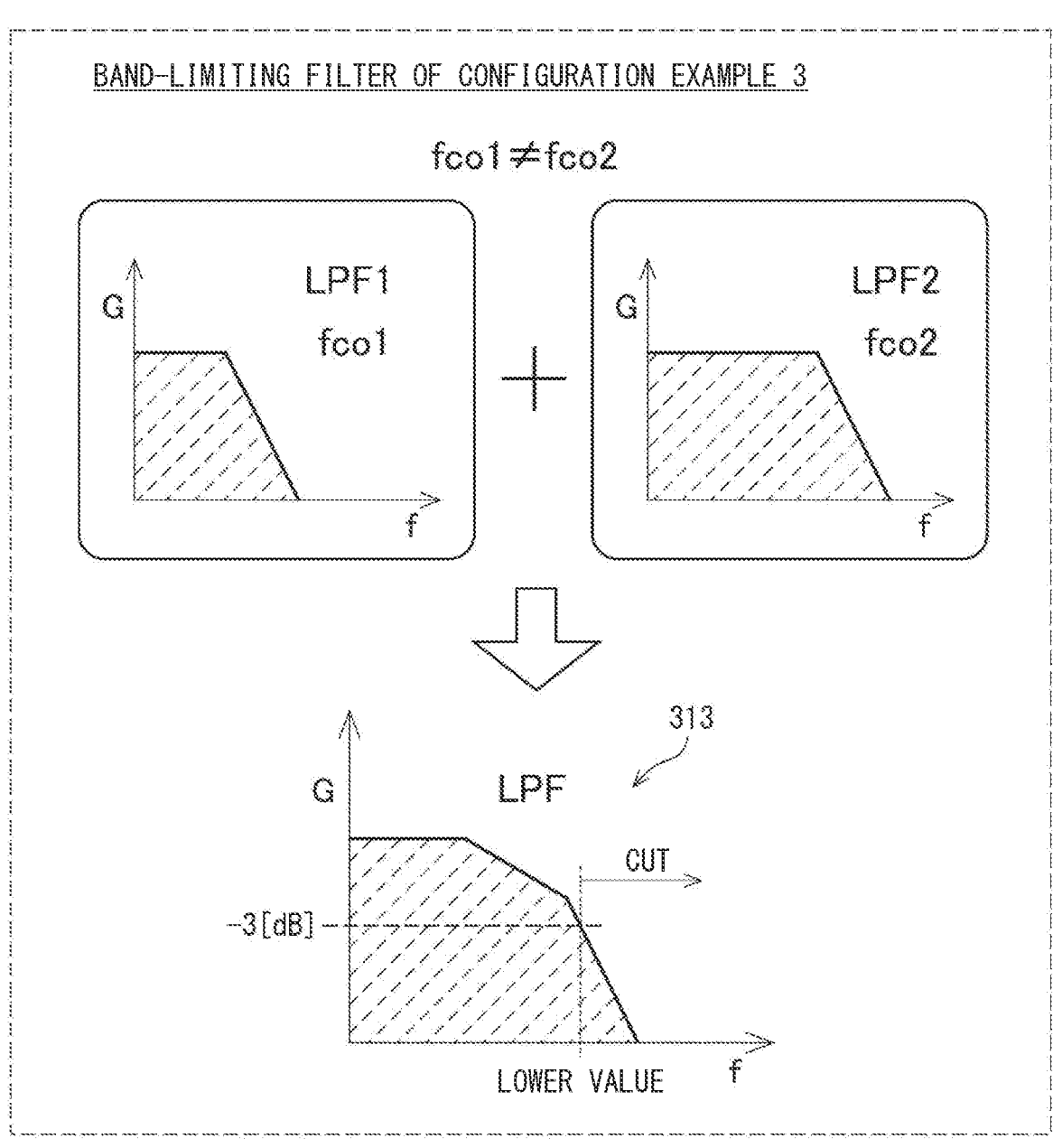
FIG. 10 is a diagram of a configuration example 3 of a band-limiting filter.

The band-limiting filter 313 of a configuration example 3 is composed of a plurality of low-pass filters having the different cutoff frequency. FIG. 10 shows a band-limiting filter 313 composed of two low-pass filters LPF1 and LPF2. The cutoff frequency fco1 of the low-pass filter LPF1 is different from the cutoff frequency fco2 of the low-pass filter LPF2.

In configuration example 3, by combining a plurality of low-pass filters with different cutoff frequencies, in addition to the effect of cutting high-frequency components similar to the configuration example 2, a phase delay of the q-axis current can be suppressed.

As described above, in the motor control device 18 of the present embodiment, by adjusting the d-axis current command final value Id** based on the q-axis current command value Iq* by the d-axis current adjuster 30, temporal changes in the q-axis current command value Iq* in a specific frequency band are suppressed. That is, the influence of the frequency component of the q-axis current command value Iq* in the specific frequency band on the d-axis current is suppressed. Therefore, in a motor control device that performs field-weakening control, it is possible to appropriately suppress the generation of noise and vibration due to the influence of changes in the q-axis current command value.

In particular, in the electric power steering device 90, it is necessary to consider follow-up performance and motor noise and vibration, and how to set the d-axis current command is important. In the present embodiment, the electric power steering device 90 suppresses sounds and vibrations that the driver feels uncomfortable, thereby improving comfort during driving. In addition, in a two-drive system or a complete two-system motor drive system, the d-axis current command can be adjusted independently based on the information for each system.

Other Embodiments (a) The band-limiting filter 31 in the present disclosure is not limited to the configuration example described above, and may be configured by a combination of a plurality of other primary filters or by one primary filter. Also, not limited to the configuration using a band-limiting filter, in order to suppress the influence of the frequency component of the q-axis current command value Iq* in the specific frequency band, it is sufficient that the d-axis current adjuster 30 adjusts the d-axis current command final value Id** based on the q-axis current command value Iq*.

(b) The field-weakening control according to the present disclosure may be used in combination with other field-weakening controls disclosed in JP 2007-116849 A (US 2007/0107973) and the like as long as there is no interference or contradiction in operation. The disclosure of which is incorporated herein by reference.

Figure 2:
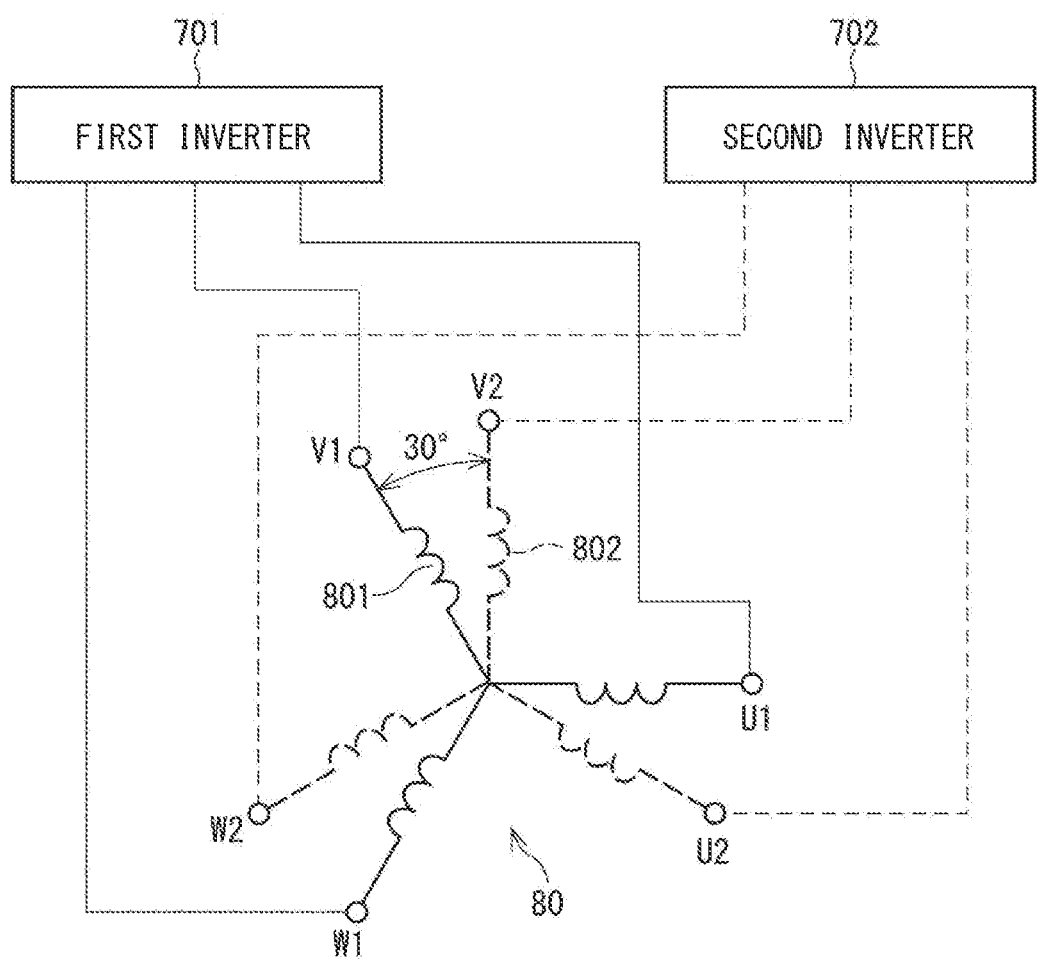
FIG. 2 is a schematic diagram showing a configuration of a double winding motor.

(c) The motor to be controlled may be a multi-winding motor having three or more sets of windings, in addition to the double winding motor shown in FIG. 2. The motor control device may be applied to a motor drive system provided with three or more inverter systems corresponding to three or more winding sets. In a multiple-system motor drive system, the motor control device includes multiple current controllers 27 and 28 and multiple field-weakening controllers 50 corresponding to multiple inverters 70. A plurality of field-weakening controllers 50 perform field-weakening control for each system.

(E) The motor control device according to the present disclosure is not limited to the steering assist motor of the electric power steering device, but may be applied to a motor for other applications mounted on a vehicle or a motor of a system other than the vehicle.

The present disclosure should not be limited to the embodiment described above. Various other embodiments may be implemented without departing from the scope of the present disclosure.

The motor control device and the technique according to the present disclosure may be achieved by a dedicated computer provided by constituting a processor and a memory programmed to execute one or more functions embodied by a computer program. Alternatively, the motor control device and the technique according to the present disclosure may be achieved by a dedicated computer provided by constituting a processor with one or more dedicated hardware logic circuits. Alternatively, the more control device and the technique according to the present disclosure may be achieved using one or more dedicated computers constituted by a combination of the processor and the memory programmed to execute one or more functions and the processor with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A motor control device applied to a motor drive system in which power from a DC power supply is converted into three-phase AC power by an inverter and supplied to a brushless motor for calculating a voltage command output to the inverter by vector control, the motor control device comprising:

a torque command/current command converter configured to convert an input torque command into a d-axis current command value and a q-axis current command value;

a field-weakening controller configured to determine a d-axis current command correction value in a field-weakening control according to a modulation factor that correlates with a ratio of a voltage amplitude applied to an inverter to a voltage of a DC power supply;

a d-axis current final value calculator configured to output a d-axis current command final value calculated using the d-axis current command value and the d-axis current command correction value;

a current controller configured to perform a feedback control of the d-axis current command final value and the q-axis current command value; and a d-axis current adjuster configured to adjust the d-axis current command final value based on the q-axis current command value so as to suppress an influence of a frequency component of the q-axis current command value in a specific frequency band for which at least a lower limit frequency is determined.

2. The motor control device according to claim 1, wherein the d-axis current adjuster has a band-limiting filter that cuts an input frequency component of the q-axis current command value in the specific frequency band, and adjusts the d-axis current command final value based on the q-axis current command value that has passed through the band-limiting filter.

3. The motor control device according to claim 2, wherein the band-limiting filter is composed of a plurality of primary filters.

4. The motor control device according to claim 3, wherein the band-limiting filter is a band-stop filter composed of one or more low-pass filters and one or more high-pass filters.

5. The motor control device according to claim 3, wherein the band-limiting filter is composed of a plurality of low-pass filters having the same cutoff frequency.

6. The motor control device according to claim 3, wherein the band-limiting filter is composed of a plurality of low-pass filters with different cutoff frequencies.

7. The motor control device according to claim 1, wherein the motor control device is applied to a motor drive system in which the motor is a multi-winding motor having a plurality sets of winding and a plurality of inverters corresponding to a plurality sets of windings are provided, and the motor control device output a voltage command to each of the inverters.

8. The motor control device according to claim 7, wherein the plurality of inverters are individually connected to a plurality of DC power supplies.

9. An electric power steering device comprising:

a motor configured to output a steering assist torque; and a motor control device according to claim 1, which controls driving of the motor.

* * * * *